US010549251B2

(12) United States Patent
Schwerdtfeger et al.

(10) Patent No.: US 10,549,251 B2
(45) Date of Patent: Feb. 4, 2020

(54) SYSTEM AND METHOD FOR MONITORING AND CONTROLLING A POLYMERIZATION SYSTEM

(71) Applicant: Chevron Phillips Chemical Company LP, The Woodlands, TX (US)

(72) Inventors: Eric D. Schwerdtfeger, Bartlesville, OK (US); Daniel G. Hert, Owasso, OK (US); Eric J. Netemeyer, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 15/710,183

(22) Filed: Sep. 20, 2017

(65) Prior Publication Data

US 2019/0083950 A1    Mar. 21, 2019

(51) Int. Cl.
*B01J 19/00* (2006.01)
*B01J 19/06* (2006.01)
(Continued)

(52) U.S. Cl.
CPC ............ *B01J 19/002* (2013.01); *B01J 19/06* (2013.01); *B01J 19/245* (2013.01);
(Continued)

(58) Field of Classification Search
CPC ...... B01J 19/00; B01J 19/0006; B01J 19/002; B01J 19/06; B01J 19/24; B01J 19/245;
(Continued)

(56) References Cited

U.S. PATENT DOCUMENTS 3,138,029 A    6/1964   Rich
3,729,987 A    5/1973   Chao et al.
(Continued)

OTHER PUBLICATIONS

Xalter et al., Online Monitoring of Polyolefin Particle Growth in Catalytic Olefin Slurry Polymerization by Means of Lasentec Focused Beam Reflectance Measurement (FBRM) and Video Microscopy (PVM) Probes, 2010, Macromolecular Reaction Engineering, 4, 25-39.*

(Continued)

*Primary Examiner* — Natasha E Young
(74) *Attorney, Agent, or Firm* — Conley Rose, P.C.

(57) ABSTRACT

The present disclosure relates generally to a system having a reactor system with a polymerization reactor and a feed system fluidly coupled to a feed inlet of the reactor. The feed system supplies components to the reactor via the feed inlet, and the reactor has a flow path that continuously conveys the components through the reactor and subjects the components to polymerization conditions to produce a polymer. The system also has an analysis system coupled to the reactor for online monitoring of a particle size of the polymer. Further, the system includes a control system, coupled to the analysis and feed systems, that receives a signal from the analysis system indicative of the monitored particle size of the polymer and adjusts an operating parameter of the feed system to control a flow rate of at least one of the components to the reactor based at least on the signal.

20 Claims, 5 Drawing Sheets

(51) Int. Cl.
*B01J 19/24* (2006.01)
*C08F 110/02* (2006.01)
*C08G 85/00* (2006.01)

(52) U.S. Cl.
CPC ......... *B01J 19/2465* (2013.01); *C08F 110/02* (2013.01); *C08G 85/006* (2013.01); *B01J 2219/00033* (2013.01); *B01J 2219/00051* (2013.01); *B01J 2219/00186* (2013.01); *B01J 2219/00247* (2013.01)

(58) Field of Classification Search
CPC ................ B01J 19/2455; B01J 19/2465; B01J 2219/00; B01J 2219/00002; B01J 2219/00027; B01J 2219/00033; B01J 2219/00049; B01J 2219/00051; B01J 2219/00186; B01J 2219/00245; B01J 2219/00247; C08F 110/00; C08F 110/02; C08G 85/00; C08G 85/006
See application file for complete search history.

(56) References Cited

U.S. PATENT DOCUMENTS

| | | | |
|---|---|---|---|
| 5,616,661 A * | 4/1997 | Eisinger | C08F 210/18 526/88 |
| 6,246,474 B1 | 6/2001 | Cerni et al. | |
| 7,417,095 B2 | 8/2008 | Battiste | |
| 8,703,382 B2 * | 4/2014 | Maruno | C08F 2/48 101/453 |
| 8,822,572 B2 | 9/2014 | Hain et al. | |
| 8,871,886 B1 * | 10/2014 | Hottovy | C08F 210/14 526/348 |
| 2001/0055639 A1 | 12/2001 | Moritz et al. | |
| 2015/0361186 A1 * | 12/2015 | Fouarge | C08F 2/01 526/64 |

OTHER PUBLICATIONS

Hukkanen, E., et al., "Measurement of Particle Size Distribution in Suspension Polymerization Using in situ Laser Backscattering," Sensors and Actuators B, vol. 96, 2003, pp. 451-459, Elsevier B.V.
Maaβ, S., et al., "Experimental Comparison of Measurement Techniques for Drop Size Distributions in Liquid/Liquid Dispersions," Experiments in Fluids, 2011, vol. 50(2), pp. 259-269.
Xalter R., et al., Online Monitoring of Polyolefin Particle Growth in Catalytic Olefin Slurry Polymerization by Means of Lasentec Focused Beam Reflectance Measurement (FBRM) and Video Microscopy (PVM) Probes; Macromolecular Reaction Engineering, 2010, vol. 4, pp. 25-39, Wiley-BVH Verlag GmbH & Co. KGaA, Weinhelm.
Maaβ, S., et al., "Measurement Techniques for Drop Size Distributions in Stirred and Fast Coalescing Liquid-Liquid Systems," Czasopismo Techniczne Mechanika, 2008, vol. 105 (5-M), pp. 219-230, Biblioteka Cyfrowa Politechniki Krakowskiej.

* cited by examiner

SYSTEM AND METHOD FOR MONITORING AND CONTROLLING A POLYMERIZATION SYSTEM

BACKGROUND

The present disclosure relates generally to systems and methods for monitoring and controlling polymerization systems.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging (such as juice and soda bottles), household containers (such as pails and boxes), household items (such as appliances, furniture, carpeting, and toys), automobile components, pipes, conduits, and various other consumer and industrial products.

One benefit of polyolefin construction is that it is generally inert and non-reactive with goods or products with which it is in contact, as well as with the surrounding environment. This property allows polyolefin products to be used in many residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

The raw polyolefin is typically produced in bulk by petrochemical facilities, which have ready access to monomers (e.g., ethylene) and comonomers, such as alpha olefins (e.g., 1-butene or 1-hexene or 1-octene), that serve as the molecular building blocks of the polyolefins to be produced. In some polymerization processes, the components used for polymerization, such as a monomer, a comonomer, and a catalyst facilitating polymerization of the monomer and comonomers, are solvated and/or suspended in a diluent. In these cases, the catalyst and the polyolefin formed as a result of the polymerization reaction are typically suspended in the diluent to form a slurry. The polymerization reaction itself may be performed in systems, such as a polymerization reactor, where temperature and pressure can be regulated to produce polyolefins having certain desired properties.

However, in some circumstances, during standard operation, the polymerization reactor may "foul," an event that occurs when the polymerized product formed adheres on the inside of the reactor walls, or when the product cannot be maintained as a slurry and solidifies within the reactor. Such a foul may result in a loss in heat transfer, such as due to a reduction in circulation or reduced efficiency at a heat exchanger interface, which may impair or completely negate the capacity to maintain the desired temperature within the reactor. A reactor foul may also result in a reduction in the circulation of the reactor contents and/or in a variation from the desired percent solids (measured by volume or by weight) of the reactor slurry. To the extent that a change in the operation of a reactor, such as in a fouling situation, may result in deviations from the desired reaction conditions, the polymer product produced during such a reactor foul may not meet the desired specifications; that is, the product may be "off-spec." In extreme or runaway fouling situations, control of the reaction may be lost entirely, and the reactor may become plugged with polymer, requiring weeks to clear, during which time the reactor may not be operated. Therefore, a system that monitors reactor contents and adjusts a feed of polymerization components to prevent or minimize the occurrence of fouling is desired.

Further, due to their potential for fouling, reactors are typically operated with some headroom to avoid fouling conditions because it is difficult to monitor exact conditions within the reactor. For example, conditions within the reactor may often be inferred based on operational parameters (e.g., temperature and/or pressure). It is now recognized that it would be desirable to be able to more accurately evaluate polymerization conditions to enable enhanced polymer production and improved control over the polymerization process itself.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
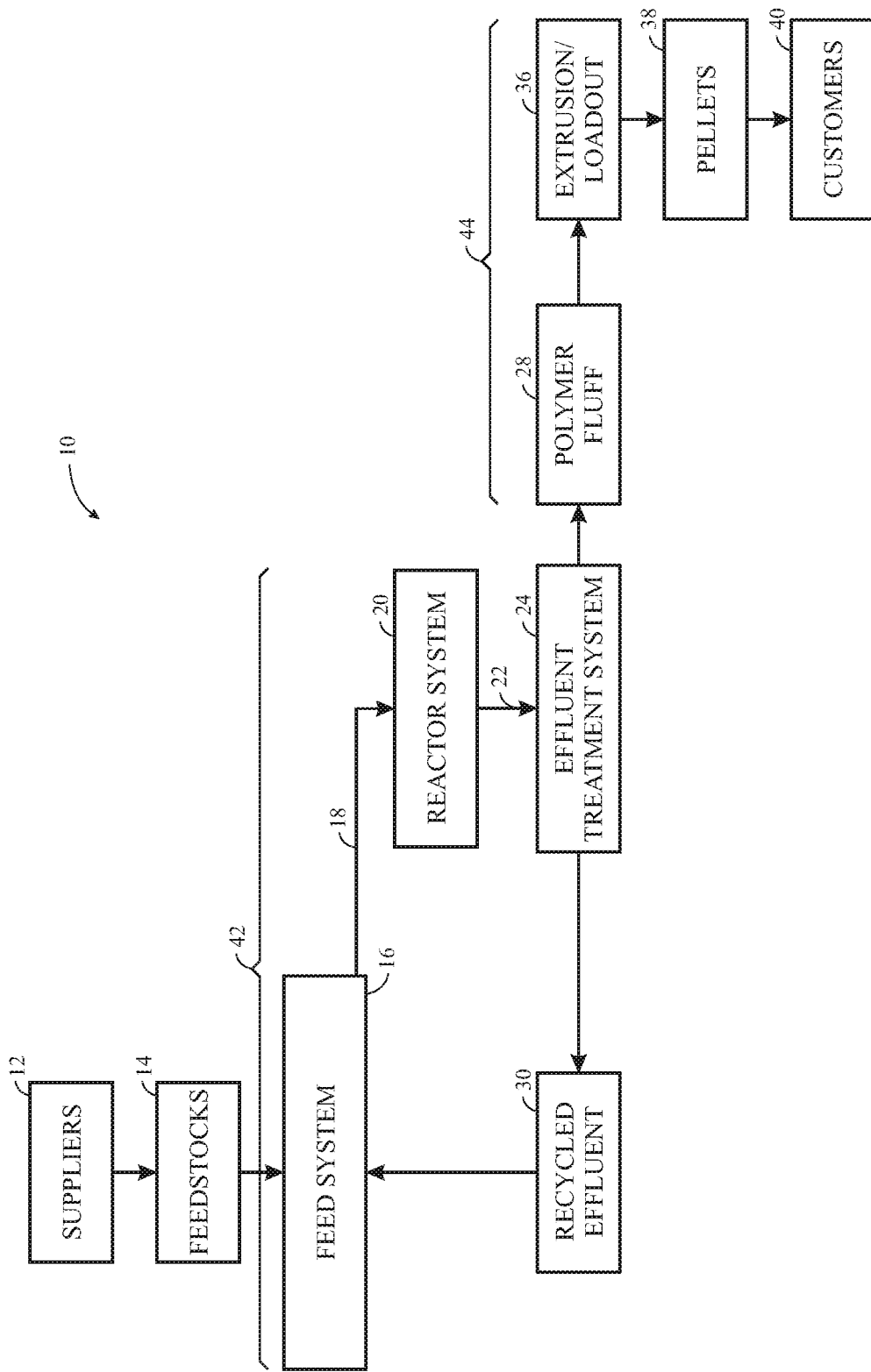
FIG. 1 illustrates a block flow diagram depicting a polymerization system for the continuous production of polyolefins, in accordance with an embodiment of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION OF SPECIFIC EMBODIMENTS

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, and the like may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Fouling may occur due to a variety of different factors, depending on the type of polymerization system and circumstances. Depending on the type of foul, the external indications that such a foul exists or is imminent may include deviations from the set reaction temperature or increased demand on the coolant system to maintain the set temperature value. Similarly, an increase in the temperature difference between the coolant inlet temperature and reactor temperature may be indicative of certain types of reactor fouls, such as those which interfere with the transfer of heat through the reactor walls. Another external indication of a foul may be an increased motor load as the pump attempts to maintain a velocity within the reactor sufficient to keep the polymer and catalyst particles suspended or attempts to compensate for restriction or obstruction of the flow path. Similarly, a high pressure difference may be observed at the pump and may indicate the presence of some fouls.

As an example, fouling may occur when the reactor temperature increases beyond a desired operating range. Such a deviation may result in swelling of the polymer particles and an increased tendency for the particles to agglomerate into larger particles, both of which can increase the polymer volume percent in the reactor. The higher volume percent solids may result in a decrease of the circulation rate. To compensate, the reactor circulating pump works harder to propel the fluid and particles, resulting in a high motor load and a high pressure differential (e.g., $\Delta P$).

Similarly, fouls may occur in which circulation of the reactants and product in the reactor system is interrupted or degraded. For example, when reactor solids and monomer concentrations are above desired levels, large polymer particles may be formed which can plug continuous take-off valves or other outlet valves or conduits. The large polymer particles may also settle out of the slurry in the reactor, where they may restrict the flow of slurry. Furthermore, the large polymer particles increase volume percent solids in the reactor, increasing the flow resistance of the slurry and leading to a corresponding high motor load and a high $\Delta P$ as the reactor circulating pump compensates for the increased resistance.

An increase in small particles of polymer, i.e., "fines," may also result in a form of fouling. In particular, an increased number of fines may increase the viscosity of the slurry due to the corresponding increase in particulate surface area for the same mass fraction of polymer. To compensate for the increase in viscosity, the reactor circulating pump works harder, resulting in a higher motor load and $\Delta P$. Accordingly, fouling may result from the particles in the reactor system being either too large or too small.

Another type of fouling that may occur, depending on the reaction environment, is static fouling. Static fouling is typically associated with fines and/or catalysts being held to the reactor wall by electrostatic forces. The catalyst particles and catalyst within the fines facilitate polymerization along the reactor wall, resulting in a film or layer of polymer growing on the reactor wall. As the layer of polymer grows, it decreases the transfer of heat from the reactor to the reactor coolant. The loss of heat transfer resulting from the polymer layer may result in a lowering of the coolant temperature at the inlet to maintain the desired production rate. As a result, the temperature differential, (i.e., the difference between the coolant inlet temperature and reactor temperature) may increase. Furthermore, the layer of polymer restricts the flow of slurry along the reactor wall, resulting in an increased motor load and $\Delta P$ at the circulating pump.

As might be expected, a foul may be indicated by some or all of the factors mentioned above. In response to the various indicators of a foul, a rapid response may regain control of the reaction. Depending on the foul, such responses may include adjusting the reactor temperature by increasing or decreasing a flow rate of coolant, increasing the addition rate of diluent (such as isobutane), decreasing the addition rate of monomer, adding anti-static agents, and/or decreasing the addition rate of catalyst.

The present disclosure is directed to the detection and reduction and/or prevention of fouls in polyolefin polymerization systems. In particular, the detection of impending reactor fouls using techniques for monitoring particle size of polymerization components is discussed. In addition, the present disclosure discusses techniques to prevent reactor fouls by controlling the rate of addition of polymerization components based upon feedback (e.g., particle size measurement, slurry density measurement, bulk density measurement) from an analysis system. Once warning signs of fouling are detected, impending reactor fouls may be prevented via upstream adjustments or "corrective actions" to the polymerization system.

In addition to potentially preventing fouling in the polymerization system, the presently disclosed systems and methods may also enable finer control over the polymerization system, which may lead to a higher quality product (e.g., polymer). Numerous operating parameters may ultimately affect the quality of the final product, and therefore are generally constantly monitored. Additionally, the operating parameters may, together or in combination, indicate or predict fouling. When a parameter reaches a level that may contribute to fouling, corrective action may be taken by a controller and/or a human operator. However, the level at which corrective action is taken may be relatively early because physical characteristics of contents in the system are uncertain when relying on operating parameters such as temperature, pressure, density, and the like. Early corrective action may decrease the quality of the final product because the operating parameters may be deviated from optimal levels. The presently disclosed techniques provide finer control over the operating parameters, such that corrective action may not be taken as early. For example, in accordance with an embodiment of the present disclosure, a probe may be coupled to a reactor of the polymerization system to monitor, for example, a particle size of the polymer being produced. Accordingly, more certainty regarding the reactor contents (and whether fouling is imminent) may be achieved and less reliance may be placed on other operating parameters. For example, a controller and/or human operator may more certainly understand how a change in an operating parameter, no matter how minor, affects particle size of contents in the system. It is now recognized that the presently disclosed techniques may enable the polymerization system to have finer control in taking corrective action to prevent fouling, which may generate a higher quality polymer.

Turning to the figures, FIG. 1 illustrates a block flow diagram depicting a polymerization system 10 for the continuous manufacture of polyolefins, such as polyethylene homopolymer, copolymer, and/or terpolymer. Polymerization system 10 may generally comprise upstream equipment 42 configured to produce a polyolefin, and downstream equipment 44 configured to extract the polyolefin from the slurry and/or subject or direct the polyolefin to further processing. To produce such polyolefins, various suppliers 12 may provide reactor polymerization components (or equivalently, as used herein, "feedstocks") 14 to polymerization system 10 via pipelines, trucks, cylinders, drums, and so forth. The suppliers 12 may include off-site and/or on-site facilities, including olefin plants, refineries, catalyst plants, and the like. Examples of possible polymerization components or feedstocks 14 include olefin monomers and comonomers (e.g., ethylene, propylene, butene, hexene, octene, decene), diluents (e.g., propane, isobutane, n-hexane, n-heptane), chain transfer agents (e.g., hydrogen), catalysts (e.g., Ziegler catalysts, Ziegler-Natta catalysts, chromium catalysts, metallocene catalysts), co-catalysts (e.g., triethylaluminum alkyl, triethylboron, methyl aluminoxane), and other additives. As a non-limiting example, in one process in accordance with the present disclosure, ethylene feedstock may be continuously supplied via pipeline at approximately 800-1450 pounds per square inch gauge (psig) (5.5-10.0 MPa) at 45-65° Fahrenheit ("F") (17.2-18.3° C.), and hydrogen feedstock may also be supplied via pipeline, but at approximately 900-1000 psig (6.2-6.9 MPa) at 90-110° F. (32.2-43.3° C.). However, a variety of supply conditions may exist for ethylene, hydrogen, and other polymerization components/feedstocks 14.

The suppliers 12 typically provide the polymerization components/feedstocks 14 to a reactor feed system 16, where the polymerization components 14 may be stored (e.g., in monomer storage and feed tanks, diluent vessels, catalyst tanks, co-catalyst cylinders and tanks). In the feed system 16, the polymerization components 14 may be treated or processed prior to their introduction as feed streams 18 into the polymerization reactors of a reactor system 20. For example, polymerization components 14 (e.g., monomer, comonomer, and diluents) may be sent through treatment beds (e.g., molecular sieve beds, aluminum packing; not shown) to remove potential catalyst poisons in the feed system 16. Catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor or reactors within the reactor system 20. Furthermore, in operation, the feed system 16 may also store, treat, and meter recovered reactor effluent for recycle to the reactor system 20.

The feed system 16 may also prepare or condition other polymerization components 14, such as catalysts, for addition to the polymerization reactors. For example, a catalyst may be activated and mixed with diluent (e.g., isobutane or hexane) or mineral oil in catalyst preparation tanks. As described above, catalyst may also be recovered from the reactor effluent. In total, the polymerization components 14 and recovered reactor effluent are processed in the feed system 16 and fed as feed streams 18 (e.g., streams of monomer, comonomer, diluent, catalysts, co-catalysts, hydrogen, additives, or combinations thereof) to the reactor system 20. Further, the feed system 16 typically provides for metering and controlling the addition rate of the polymerization components 14 into the reactor system 20 to maintain the desired reactor stability and/or to achieve the desired polyolefin properties or production rate. In certain embodiments, the rate at which the feed system 16 adds the polymerization components 14 to the reactor system 20 is adjusted by a control system (e.g., a workstation and/or a controller), as discussed in more detail herein.

The reactor system 20 may have one or more steady-state reactor vessels, such as liquid-phase reactors, gas-phase reactors, or a combination thereof. Multiple reactors may be arranged in series, in parallel, or in any other suitable combination or configuration. When multiple reactors are arranged in series, each reactor may be disposed along a single flow path of the reactor system. Conversely, multiple flow paths may exist when reactors are arranged in parallel. In polymerization reactor vessels, one or more olefin monomers are polymerized to form a product containing polymer particulates, typically called fluff or granules. The reaction conditions, such as temperature, pressure, flow rate, mechanical agitation, product takeoff, component concentrations, polymer production rate, and so forth, may be selected to achieve the desired fluff properties.

As the monomers begin to polymerize, a particle size of polymers formed within the reactor may be monitored online with a probe, which may be referred to as online monitoring, real-time monitoring, steady-state monitoring, or the like, each of which occurs while the polymerization reaction is in operation, for example during steady state operating conditions. For example, one or more particle vision and measurement (PVM) or focused beam reflectance measurement (FBRM) probes, as described in more detail hereinbelow, may be employed to monitor particle size. PVM probes operate by video microscopy, while FBRM probes operate by measuring a chord length of the polymer particulates by emitting a beam of light into the reactor, or other vessel, that reflects off of the polymer particulates, and determining particle size based on the time it takes for the light to return to the probe.

The probe may be disposed along a flow path of the polymerization system. For example, as described in more detail hereinbelow with reference to FIGS. 3 and 4, the probe may be flush, or substantially flush, with an inner surface of the reactor piping such that no gaps or extrusions are formed in the inner surface of the piping, or may be inserted into the reactor such that it is in a portion of the flow path (e.g., an extrusion in the inner surface of the reactor piping is formed).

In addition to the one or more olefin monomers, a catalyst (e.g., Ziegler catalysts, Ziegler-Natta catalysts, metallocene catalysts, other well-known polyolefin catalysts, co-catalysts) that facilitates polymerization of the monomer may be added to the reactor. In certain embodiments, the catalyst is present as a particle suspended in the fluid medium within the reactor. In addition to the polymerization components 14 described above, diluent may be fed into a liquid-phase reactor to suspend the catalyst particles and polymer within the reactor. In certain embodiments, the diluent is an inert hydrocarbon that is a liquid or a supercritical fluid at reaction conditions, depending on the desired properties of the polymer fluff or the slurry. The diluent may include isobutane, propane, n-pentane, i-pentane, neopentane, n-hexane, cyclohexane, cyclopentane, methylcyclopentane, ethylcyclohexane, and the like, or any combination thereof.

A motive device may be present within the reactor in the reactor system 20. For example, within a liquid-phase reactor, such as a loop slurry reactor, an impeller may create a turbulent mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor.

A discharge 22 of the reactors within the reactor system 20 may include polymer fluff as well as non-polymer components, such as diluent, unreacted monomer/comonomer, and residual catalyst and/or cocatalyst. After leaving the reactor system 20, the discharge 22 may be subsequently processed, such as by an effluent treatment system 24, to separate non-polymer components (e.g., diluent, unreacted monomer, and catalyst) from polymer fluff 28.

The polymer fluff 28 may be further processed within the effluent treatment system 24, in a flashline, and/or in an extrusion/loadout system 36. As generally illustrated, polymer granules and/or active residual catalyst intermediate in the effluent treatment system 24 may be returned to the reactor system 20, as recycled effluent 30 for further polymerization, such as in a different type of reactor or under different reaction conditions. Diluent and unreacted monomer may also be recycled to the reactor system 20 as part of the recycled effluent 30. It should be noted that the probes may also be present in the effluent treatment system to monitor a particle size of the polymer fluff 28 downstream from the reactor system 20.

In the extrusion/loadout system 36, the polymer fluff 28 is typically extruded from an extruder (not shown) to produce polymer pellets 38 with desired mechanical, physical, and melt characteristics. Extruder feed may optionally contain additives, such as UV inhibitors and peroxides, which are added to the polymer fluff 28 to impart desired characteristics to the extruded polymer pellets 38. An extruder/pelletizer within the extrusion/loadout system 36 receives the extruder feed, containing the polymer fluff 28 and whatever additives have been added. The extruder/pelletizer heats and melts the extruder feed which then may be extruded (e.g., via a twin screw extruder) through a pelletizer die of the extrusion/loadout system 36 under pressure to form polyolefin pellets 38. Such pellets 38 may be cooled in a water system disposed at or near the discharge of the extruder/pelletizer. In general, the polyolefin pellets may then be transported to a product load-out area where the pellets may be stored, blended with other pellets, and/or loaded into railcars, trucks, bags, and so forth, for distribution to customers 40.

It is now recognized that it may be desirable to enable enhanced control over the reactor system 20, which may enhance efficiency of the overall polymerization system 10. Such enhanced control may, for example, prevent fouling in the reactor system 20 of FIG. 1. Therefore, a control mechanism, in accordance with the present disclosure, that monitors operating conditions of polymerization system 10 and subsequently makes adjustments upstream of the reactor system 20 to prevent fouling may enhance efficiency of polymerization systems.

Figure 2:
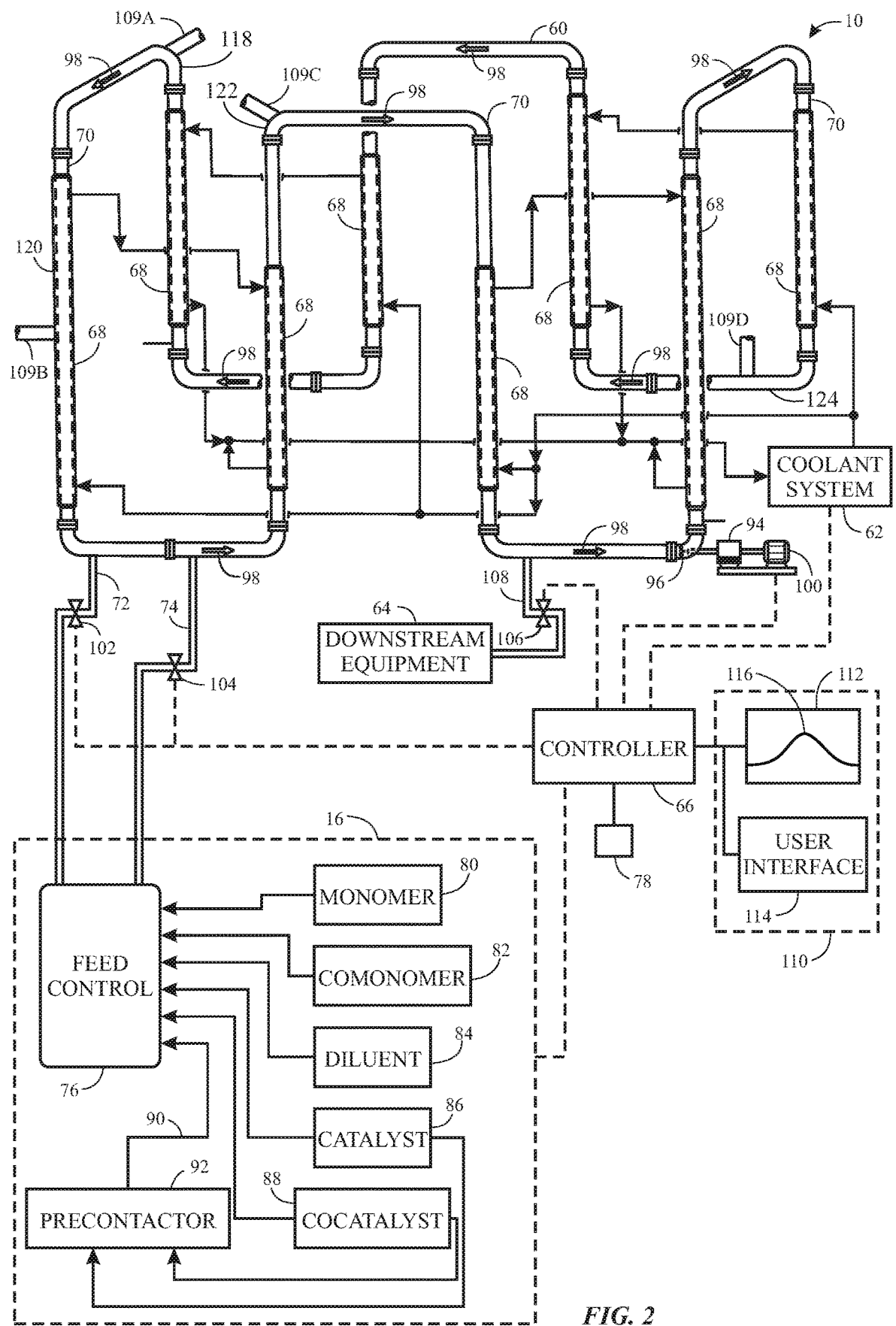
FIG. 2 illustrates a loop reactor system with features for controlling polymerization components and the prevention of reactor fouls, in accordance with an embodiment of the present disclosure.

A more specific example of the polymerization system 10 incorporating such a control mechanism is depicted in FIG. 2. For simplicity, the following discussion relates to a polymerization system 10 with a continuous (e.g., steady-state) loop reactor 60, though it is to be understood that the present techniques may be applied to other types of polymerization reactors susceptible to fouling, such as boiling liquid pool, stirred tank, and gas phase reactors. Indeed, any type of polymerization reaction or reactor may benefit from the present techniques.

The polymerization system 10 includes the loop reactor 60, a coolant system 62, the feed system 16, downstream equipment 64, and a controller 66, among other features. The coolant system 62 is configured to remove heat from the loop reactor 60 via reactor jackets 68 attached to the exterior of the reactor legs based upon temperature measurements (e.g., from a thermocouple or other temperature measurement device), for example measurements at reactor hot spots 70. While the hot spots 70 are illustrated as being measured at or near bends or elbows in the reactor 60, it should be noted that the locations of the reactor hot spots 70 may vary depending on the reactor layout, design, and operating conditions, among other factors.

During operation, the feed system 16 introduces the polymerization components into the polymerization reactor 60 via a feed inlet. In certain embodiments, two feed inlets 72 and 74 introduce the polymerization components 14 into the polymerization reactor 60. In other embodiments, the polymerization reactor 60 may receive polymerization components via one feed inlet or via more than two feed inlets (e.g., one for each of the polymerization components 14 of FIG. 1). Additionally, the polymerization system 10 may include a feed control or feed control system 76, which may include features configured to control the rate of addition of the various polymerization components 14 into the loop reactor 60. Such conditions may include temperature, flow rates of the polymerization components 14, and so forth. As mentioned, the feed control system 76 may control the flow of a number of the polymerization components into the reactor 60, such as a monomer 80, a comonomer 82, diluent 84, catalyst 86, cocatalyst 88, and so forth. Further, the feed control system 76 may control, during operation of polymerization system 10, a feed 90 which has been directed from a precontactor 92.

In certain embodiments, the controller 66 may be in communication with the feed system 16, such that, among other features, the controller 66 may include a memory containing computer code 78 configured to control the feed control system 76. For example, a processor within the controller 66 may execute the code 78, which may contain one or more algorithms capable of adjusting conditions within the reactor 60 and/or performing analyses as described below.

During operation, one or more of the polymerization components 14 may flow through the loop reactor 60, which may generally include segments of pipe connected by smooth bends or elbows. For example, the reactor 60 may be used to carry out polyolefin polymerization under slurry conditions (e.g., polymerization conditions) in which insoluble particles of polyolefin, such as polyethylene, are formed in a fluid medium and are suspended as a slurry until removed. Therefore, the reactor 60 may contain both the polymerization components 14 as well as the resulting polymer (e.g., the polymerization reactor components). The fluid medium may include diluent 84 (e.g., isobutane), monomer 80 (e.g., ethylene, propylene, butene), comonomer 82 (e.g., 1-butene, 1-hexene, 1-octene), co-catalysts 88 (e.g., alkyl aluminum reagents), activating agents and/or solid supports (e.g., solid oxides such as solid super acids (SSA's)), chain transfer agents, molecular weight control agents (e.g., hydrogen), and any other desired co-reactants or additives. Any one of the polymerization components 14 may be added to the reactor interior by the feed system 16 via the inlets 72 and 74 prior to and/or during a polymerization reaction. In certain embodiments, a particulate catalyst may be added to the reactor 60 and suspended in the fluid medium to initiate and/or maintain the desired polymerization reaction. In other embodiments, the catalyst 86 can be any suitable catalyst for polymerizing the present monomer. For example, a metallocene/solid super acid (SSA) catalyst system, a Ziegler-Natta catalyst system, a chromium oxide on solid support catalyst system, and so forth may be used in the polymerization system 10.

During operation, a motive device, such as a pump 94, circulates the fluid slurry (e.g., polymerization reactor components) in the reactor 60. For example, the pump 94 may be an in-line axial flow pump with a pump impeller 96 disposed within the interior of the reactor 60 configured to propel the fluid medium through the closed loop of the reactor 60, as depicted by arrows 98, at sufficient speed to keep solid particulates, such as the catalyst or polyolefin product, suspended within the fluid medium. As a non-limiting example, an average circulation rate of between approximately 30-45 feet/second (9.1-13.7 m/s) is typically sufficient to maintain the suspension of polymer product and catalyst as a slurry in the reactor 60. In certain embodiments, the impeller 96 is driven by a motor 100. In other embodiments, the pump impeller 96 may be driven by another motive force.

The reaction conditions within the reactor 60 may be selected to facilitate the desired degree of polymerization and the desired reaction rate. Due to the exothermic nature of the polymerization reaction, the cooling jackets 68 may be provided around portions of the closed loop system (e.g., around straight portions of the reactor piping). During operation, a cooling fluid may be circulated within the cooling jackets 68 as needed to remove the generated heat and to maintain the temperature within the desired range. In certain embodiments, the desired operating temperature range is between approximately 150-250° F. (approximately 65-121° Celsius ("C")).

As the polymerization reaction proceeds within the reactor 60, the monomer (and comonomer, if present) polymerizes to form polymers that are substantially insoluble in the fluid medium at the reaction temperature, thereby forming a slurry of solid particulates within the medium. The controller 66 may perform operations to maintain the balance between the amount of polymerization components 14 added to the reactor and the amount of slurry withdrawn. For example, the controller 66 may actuate valves 102 and 104 corresponding to feed inlets 72 and 74, respectively. The valves 102 and 104 may be, in some situations, fully or partially opened, and/or fully or partially closed. Likewise, the controller 66 may actuate a valve 106 that at least partially regulates an amount of slurry withdrawn from the reactor 60 via continuous take-off 108. As such, the solid polyolefin particulates may then be removed from the reactor 60. In some embodiments, configurations other than the continuous take-off 108 may be possible, such as the use of a settling leg or a pressure take-off valve. Downstream equipment 64 (e.g., a flashline, an extruder, or similar equipment) fluidly coupled to the reactor system 20 may extract the polyolefin from the slurry and direct the polyolefin for further processing, such that the product may be formed into parts or products for personal, commercial, and/or industrial use.

By keeping the temperature, pressure, percent by weight solids, percent by volume solids, slurry circulation rate, particle size and other reaction conditions within desired ranges and by using a suitable polymerization catalyst, the polyolefin produced by the reactor 60 may have properties desirable for a number of end uses, such as those described above. As discussed previously, however, various types of reactor fouls may occur that effectively limit or impair the control of reactor conditions, such as temperature, slurry circulation rate, and/or the percent of solids in the slurry (by weight or by volume). If not prevented or addressed, such reactor fouls may lead to undesirable economic and commercial results, such as off-spec product and/or reactor down-time. Additionally, monitoring polymer particulates in the polymerization system 10, in accordance with aspects of the present disclosure, may enable increased control over the polymerization process, which may enhance productivity and lead to a better quality product.

In certain embodiments, various analysis systems 109 may be disposed along the flow path of the reactor system 20 to monitor various parameters relating to the polymer itself, the operating parameters in the reactor 60, and, in some embodiments, to predict fouling conditions or detect fouling. For example, it may be desirable to have at least a portion the analysis systems 109 disposed in the reactor 60 itself to monitor the operating conditions of the reactor 60. Alternatively, the analysis systems 109 may be disposed upstream and/or downstream from the reactor 60, for example in an input or output line to the reactor (e.g., a continuous take-off output from a first reactor feeding to a second reactor such as a dual slurry loop polymerization reactor system). The analysis systems 109 may be configured to monitor a variety of operating conditions. For example, the analysis systems 109 may be configured to monitor one or more statistical representations relating to the particle size of the polymer, temperature of the polymerization reactor components, pressure of the reactor 60, solid composition of the polymerization reactor components, a density of the liquid fraction of the polymerization reactor components (e.g., slurry density), a flow rate of the polymerization reactor components, among other parameters.

In certain embodiments, the analysis systems 109 perform measurements that enable monitoring of aspects relating to the polymer particulates in the reactor 60, for example, particle size and/or morphology of the polymer particulates, with a probe. For example, one or more probes associated with the analysis systems 109 may comprise a focused beam reflectance measurement (FBRM) probe that monitors particle size by measuring a chord length of the polymer particulates, or a particle vision and measurement (PVM) probe that monitors particle size and morphology via video microscopy. Such probes are described in more detail hereinbelow.

The probe may be disposed along a flow path of the polymerization system 10 and scan or otherwise examine the polymer particulates passing through a desired portion of the flow path. In certain embodiments, the probe may be flush with an inner surface of the reactor piping such that no gaps or extrusions are formed in the inner surface of the piping. In other embodiments, the probe may be inserted into the reactor such that it is in a portion of the flow path (e.g., an extrusion in the inner surface of the reactor piping is formed).

Figure 3:
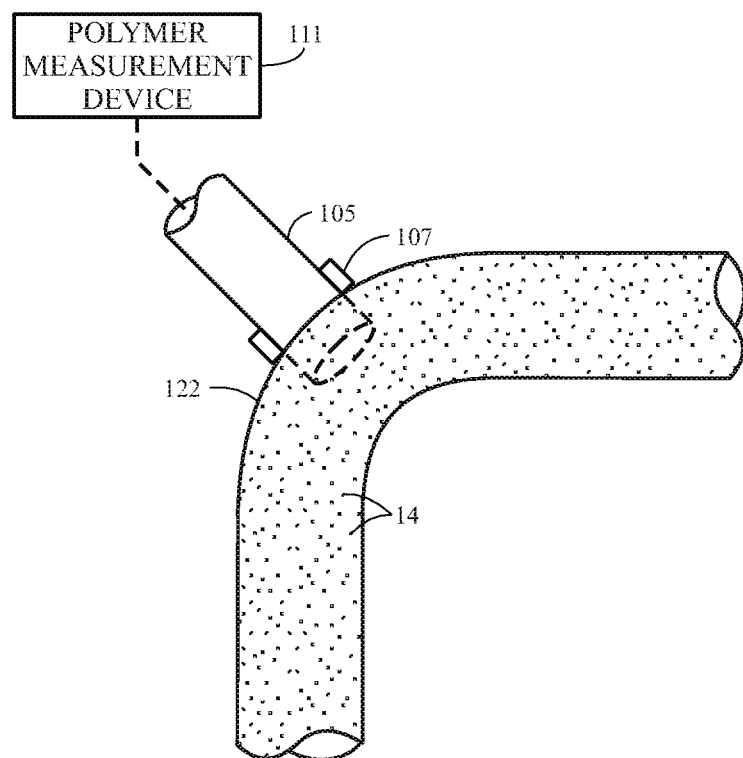
FIG. 3 illustrates a portion of the loop reactor system of FIG. 2 with a probe tapped into a wall of the loop reactor system, such that the probe is in a flow path of the loop reactor system, in accordance with an embodiment of the present disclosure.

By way of example, FIG. 3 illustrates a probe 105 tapped into a wall of a reactor, such that the probe is in the flow path of the polymerization reactor components. As will be discussed in more detail herein, the probe 105 may be located at or proximate to an elbow 122 along the flow path of the reactor 60. In certain embodiments, elbows of the reactor 60 may convey the polymerization reactor components at a turbulent flow, which may enable a more accurate measurement than segments without turbulent flow. Moreover, the probe 105 may be secured to the reactor 60 via an attachment system that includes at least one gasket 107. The gasket 107 may enable the probe 105 to fit securely in the reactor 60 without creating any leaks. The probe 105 may also be electronically coupled to a polymer measurement device 111. The polymer measurement device 111 may be a computing (e.g., processing) device having software configured to convert feedback from the probe 105 into data, or a value, corresponding to a particle size of the polymers, a density of the polymers, or the like. For example, the polymer measurement device 111 may be able to convert a chord length distribution into an average particle size, a range of particle sizes, a particle size distribution ("PSD"), or another value that corresponds to the size of the polymer particulates.

Probe 105 may be positioned at an angle to an area of polymerization system 10 wherein the polymer slurry experiences a turbulent, well-mixed flow. For example, in embodiments, probe 105 is positioned at an angle with a wall of polymerization reactor 60/160 or with a piping wall that is less than or equal to about 45, 40, 30, 25, or 20 degrees relative to the wall.

Figure 4:
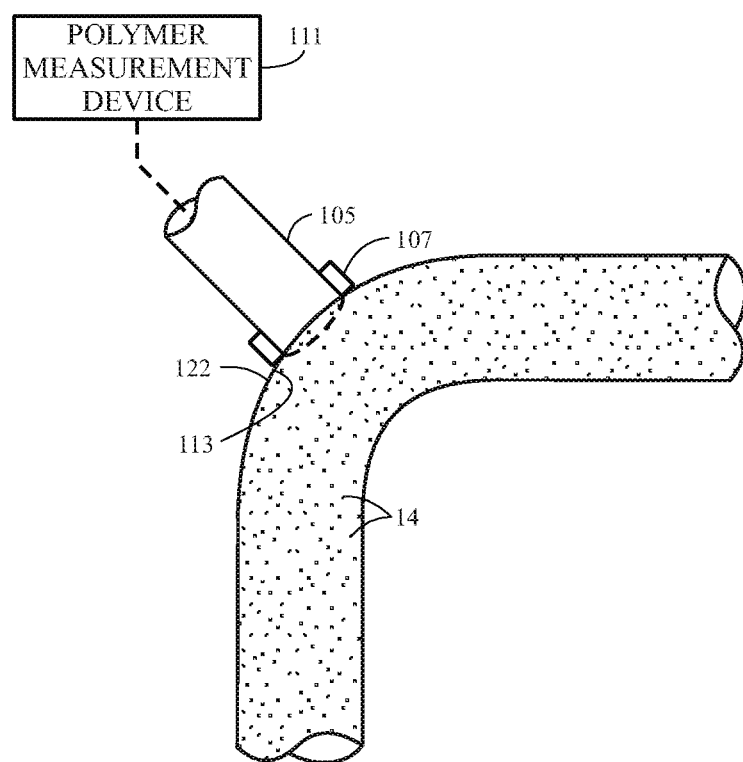
FIG. 4 illustrates a portion of the loop reactor system of FIG. 2 with a probe disposed flush with an inner surface of the loop reactor system, in accordance with an embodiment of the present disclosure.

Similarly, FIG. 4 illustrates the probe 105 flush with an inner surface 113 of the reactor 60, such that it is not in the flow path of the polymerization reactor components. As with the probe 105 of FIG. 3, the probe 105 is located at or proximate to the elbow 122 of the reactor 60. Additionally, the probe 105 is secured to the reactor 60 via an attachment system that includes the gasket 107. Again, the gasket 107 may enable the probe 105 to fit securely in the reactor 60 without creating any leaks. Additionally, the probe 105 in FIG. 4 is coupled to the polymer measurement device 111.

As noted above, in embodiments, the probe provides data on particle size and/or morphology. The probe may be operable via light backscattering or video microscopy. In embodiments, probe 105 utilizes back scattering of a laser beam. Any probe known in the art to be operable to provide data on particle size, particle shape/morphology, or particle number via light back scattering may be utilized, in embodiments. Such a probe is the focused beam reflectance measurement (FBRM) probe, such as the LASENTEC D600VL FBRM probe, which is commercially available from Mettler Toledo. FBRM is operable to track the rate and degree of changes of particles based on particle dimension and number of particles. The FBRM probe utilizes a rotating focused laser beam which is scattered back by individual particles at or near a focal point of the laser beam. The duration and intensity of the backscattered light is utilized to evaluate the particle number and dimension. FBRM may be particularly suited to online monitoring of polymer systems, as the intensity of the back scattered light is substantially higher than the scattered light measured with conventional light scattering (LS), and the fact that multiple scattering at particles combined with complex secondary scattering patterns is greatly reduced because the back scattered light in FBRM travels only a short distance through the slurry back to the probe window. Thus, FBRM is operable in systems with higher solids concentrations than conventional LS.

Probe 105 may be an FBRM probe configured to emit a laser (e.g., an infrared laser) beam through a set of optics and focused to a tight beam spot at a probe window (e.g., a sapphire window) on a tip of the probe positioned in the flow path of the reactor polymerization components 14. The probe may be configured such that the optics rotate at a fixed scan speed allowing the beam spot to rapidly scan across polymer particles as they flow by the window of the probe. In embodiments, the rotation speed may be in the range of from about 0.5 to about 10 meters per second (m/s). In embodiments, the speed of rotation is about 2 m/s; however, any appropriate scan speeds may be used.

When the rotating laser beam hits upon a polymer particle that is near the laser beam focus, the light is reflected and may be propagated back through the probe window. The reflected laser light is then detected (e.g., by a photodiode) and converted to an electrical signal which can be processed by the electronics of the probe. The pulse of backscattered light may correspond to the particle size of the polymer particulate because the duration of the pulse may correlate to the time it takes for the beam of light to reflect from one end of the particle to the other end. From the known beam velocity (i.e., the scan speed, $v_b$) and the detected duration time of reflection ($\Delta t$), the corresponding chord length (CL) can be calculated by:

$$CL = v_b \Delta t \quad (1)$$

The corresponding chord length counts are summed up (e.g., in 1400 CL intervals or channels) to provide a CL histogram. The FBRM probe may measure tens of thousands of chords per second, thus providing a reliable chord length distribution (CLD) (e.g., the histogram of the chord length counts). The CLD may be unique for a given particle size distribution (PSD) and particle shape distribution. Generally, FBRM may be operable to detect polymer particles in the range of from submicron (e.g., 0.5 μm) to about 3 mm, or more. Probe 105 may be operable to record CLDs at regular intervals, e.g., every 2 seconds.

In embodiments, square-weighting may be applied (via probe 105, polymer measurement device 111, and/or analysis system 109) to the CLD to transform the length-based CLD to a volume-based distribution, as such a square-weighted percentage distribution of chord lengths may better correlate with conventional, intrinsically volume-based PSDs obtained, for example, via conventional light scattering. The FBRM probe may be operable to provide average particle sizes, particle size ranges, and/or full PSDs. Various (size) analyses based on FBRM that are known in the art can be utilized to monitor polymerization system 10. For example, such analyses are described by Xalter and Mül- haupt in Macromol. *React. Eng.* 2010, 4, 25-39, and by Maaβ, Horn, and Kraume in *Czasopismo Techniczne Mechanika,* 2008, 105(5-M), 219-230, and by Maaβ, Wollny, Voight, and Kraume in *Experiments in Fluids* 2011, 50(2), 259-269, the disclosure of each of which is hereby incorporated herein by reference in its entirety for all purposes not contrary to this disclosure.

As noted above, in embodiments, probe 105 is operable via video microscopy. Any probe known in the art to be operable to provide data on particle size, particle shape/morphology, and/or particle number via video microscopy may be utilized, in embodiments. Such a probe is the particle vision and measurement (PVM) probe (e.g., the LASENTEC V819 PVM probe), which is commercially available from Mettler Toledo. The PVM probe enables video microscopic observations of moving particles via charge coupled device (CCD) camera-mediated imaging utilizing a pulsed light source. The PVM probe can be operable to provide information on particle morphology and surface structure and, with image evaluation (via probe 105, polymer measurement device 111, and/or analysis system 109), provide data on average particle size and PSDs.

In embodiments, probe 105 is a PVM probe comprising multiple (e.g., six) separate laser sources that illuminate a fixed area at a tip of the probe. The light that is backscattered is focused on the CCD camera. In embodiments, the PVM probe provides images of 1075 μm by 825 μm, and a resolution of 2 μm. The probe may provide in situ high resolution images at a desired rate, e.g., 3 images per second.

Various (size) analyses based on PVM that are known in the art can be utilized to monitor polymerization system 10. For example, such analyses are described in Macromol. *React. Eng.* 2010, 4, 25-39.

The probe 105 may send signals to the analysis systems 109 (e.g., via the polymer measurement device 111) and/or to a workstation 110 that correspond to all chord lengths (e.g., a chord length distribution) collected over a scanned area. In certain embodiments, the workstation 110 may include the controller 66 and/or another computing device configured to monitor and control operating parameters of the polymerization system 10. In other embodiments, the workstation 110 and the controller 66 may form all or part of a control system.

In certain embodiments, the analysis systems 109, or certain control features in communication with the analysis systems 109 (e.g., the controller 66) may be able to convert a chord length distribution into an average particle size, a range of particle sizes, a particle size distribution ("PSD"), or another value that corresponds to the size of the polymer particulates. In other embodiments, the analysis systems 109 may transmit a signal that includes the chord length distribution to the workstation 110.

Turning back to FIG. 2, the workstation 110 may include computing devices (e.g., the controller 66) programmed to convert the chord length distribution into an average particle size, a range of particle sizes, a PSD, or another value indicative of particle size. Further, the workstation 110 may use such value to calculate a bulk density of the polymerization components. For example, the workstation 110 may calculate the bulk density using the PSD of the polymer particulates and a slurry density value received from another analysis system 109 configured to measure a density of the liquid fraction of the polymerization reactor components. In certain embodiments, the slurry density may be representative of the density of the liquid fraction of the polymerization reactor components within the reactor 60 or other device in the polymerization system 10. The bulk density may be calculated by, for example, using the PSD of the polymer particulates and the slurry density, since the PSD may correlate to a density of a solids fraction of the polymerization reactor components. Therefore, the workstation 110 can use the two values (e.g., the density corresponding to a solids fraction and the density corresponding to a liquid fraction) to find a bulk, or overall, density value of the polymerization reactor components. Based on the particle size value alone and/or the bulk density value, the workstation 110 may adjust the feed system 16 or other components of the polymerization system 10 to prevent fouling.

For example, the respective flow rate of the monomer, comonomer, diluent, catalyst, and/or co-catalyst to the polymerization reactor 60 may be adjusted when the workstation 110 determines that a signal received from the analysis system 109 is indicative of a bulk density of the polymer slurry, a particle size distribution of the polymer, an average particle size of the polymer, a particle size range of the polymer, or any combination thereof, outside of a predetermined range. Additionally, the respective flow rate of the comonomer to the polymerization reactor may be adjusted when the workstation 110 determines that the signal received from the analysis system 109 is indicative of a copolymer foul or an incipient copolymer foul. Such actions of the workstation 110 are described in more detail below.

As shown, the polymerization system 10 includes several of the analysis systems 109 disposed along various points of the reactor 60. In certain embodiments, the polymerization system 10 may have only one analysis system 109 disposed on (within) the reactor 60. Alternatively, the polymerization system 10 may include 2, 3, 4, 5, 6, 7, 8, 9, 10, or more analysis systems 109 disposed in various locations along the reactor 60. For example, the reactor 60 may have only one analysis system 109A disposed on an elbow 118 of the reactor 60. Alternatively, or in addition to having one of the analysis systems 109 disposed on the elbow 118, the analysis system 109B may be disposed along a straight segment 120 of the reactor piping. Further, the reactor 60 may have a third analysis system 109C on a second elbow 122 and/or a fourth analysis system 109D on a second straight segment 124. It should be understood that polymerization system 10 may comprise one or more polymerization reactors 60 and one or more analysis system 109, and that zero, one, or multiple analysis systems 109 may be disposed along each polymerization reactor. In certain embodiments, an analysis system 109 may be disposed along the continuous take-off 108, such that the polymerization components exiting the reactor 60 may be monitored as well.

In some situations, it may be desirable to use feedback received from the analysis systems 109 in the workstation 110 to enable finer automated control over a continuous polymerization system. The workstation 110 may be configured to monitor various system parameters (e.g., temperature, pressure, particle size, and/or density) and initiate corrective action by various feed mechanisms, temperature control mechanisms, and so forth, to prevent reactor fouls, and/or enable the reactor to operate with a tighter tolerance around potential foul conditions. The workstation 110 may include a display 112 and a user interface 114 in addition to the controller 66 to enable human operators to make adjustments, view information relating to the reaction system 20 and its contents, and so forth.

For example, the display 112 may be configured to display a variety of information about the loop reactor 60, coolant system 62, feed system 16, and so forth. Further, in certain embodiments, the display 112 may show information related to contents within the reactor, such as a particle size of the polymer particulates within, or downstream from, the reactor. As an example, the display 112 may provide a graphical representation of a PSD 116. The display 112 may include a single screen or a number of screens wherein a series of data and/or other operational information may be displayed. Accordingly, the workstation 110 may be configured to retrieve the data displayed on the display 112 from any number of sources, including the analysis systems 109, reactor hot spots 70, continuous take-off 108 (or other continuous take-offs), adjustment valves 102 and 104 for inlets 72 and 74, cooling jackets 68, coolant system 62, feed system 16 (and its inclusive features), and/or the downstream equipment 64, and may be communicatively coupled to each.

In some embodiments, the workstation 110 may be configured to accept media, such as solid-state memory, hard drives, and discs such as compact discs, digital video discs, and the like. The storage media may contain code configured to perform the analyses (e.g., bulk density calculation) and perform adjustments to the polymerization system 10. As noted above, the workstation 110 may be configured to monitor one or more reactor operating conditions, such as pump power, temperature, pressure, and so forth. Further, the workstation 110 may be configured to monitor the current state of the polymerization components 14 within the polymerization reactor 60, such as the particle size, solids weight percent, the monomer weight percent, the catalyst weight percent, the feed rates of some or all of the polymerization components, a slurry density, and the like.

In certain embodiments, the display 114 may show the graphical representation of the PSD 116, or other visual information related to the polymerization system 10, for review by a human operator. As such, the human operator may make manual adjustments to the polymerization system 10 based on the displayed results.

In other embodiments, the workstation 110, via the controller 66, may automatically adjust operating parameters of the polymerization system 10 in response to the feedback received from the analysis systems 109 or other monitoring devices. If a predictive indicator, such as a large (e.g., rapid) increase in the particle size of the polymer particulates within the reactor 60, is detected, the controller 66 may adjust the operation of the reactor 60 in accordance with a preconfigured response. For example, if a reactor foul is predicted (e.g., a feedback received from the analysis systems 109 indicates particle size is outside a predetermined range), the controller 66 may perform operations to reduce particle size, such as by increasing the rate of diluent 84 added to the reactor 60; by reducing the addition of monomer 80, comonomer 82, or catalyst 86; or by increasing the influx of additives, such as anti-static agents, or any combination of these or similar adjustments. In one embodiment, valve control circuitry or code contained within the workstation 110 causes the controller 66 to generate signals that adjust the flow of diluents 84, solids, monomer 80, comonomer 82, catalyst 86, and/or additives by adjusting valves 102, 104, and/or 106 via actuators. Additionally or alternatively, the workstation 110 may provide a user perceivable indication that an adjustment should be made to the reactor 60.

According to the present technique, it may be desirable to predict impending fouls sufficiently in advance that preventative action may be taken, which is typically less severe than the action that is suitable for recovery from an ongoing foul. For example, predictive techniques may utilize signals from the analysis systems 109 corresponding to particle size of the polymerization components (e.g., some measure generated based on measured particle size) to predict fouling prior to onset so that preventative steps may be taken. Such a technique is discussed in more detail below with respect to FIG. 7.

The present disclosure is also applicable to reactor systems 20 employing a plurality of reactors in series, in parallel, or both. For example, in some instances, it may be desirable to have the ability to produce a bimodal polymer, or a product having polymers with a bimodal molecular weight distribution, in the polymerization system 10. Multimodal polymers (e.g., product having multiple molecular weight distributions) may also be produced. Bimodal polymers may be beneficial for various applications of piping, food packaging, blow molding, and lamination. Indeed, bimodal polymers have many uses when the processing of the polymer involves molding, extrusion, and the like. Generally, the reactor system 20, if used to produce a bimodal polymer, may include two polymerization reactors in series. As one non-limiting example, one polymerization reactor may produce a polymer having a high molecular weight and a low density and the other polymerization reactor may produce a polymer having a lower molecular weight and a higher density. In this way, the product obtained from the output of the second reactor may have the benefit of both molecular weight distributions.

Figure 5:
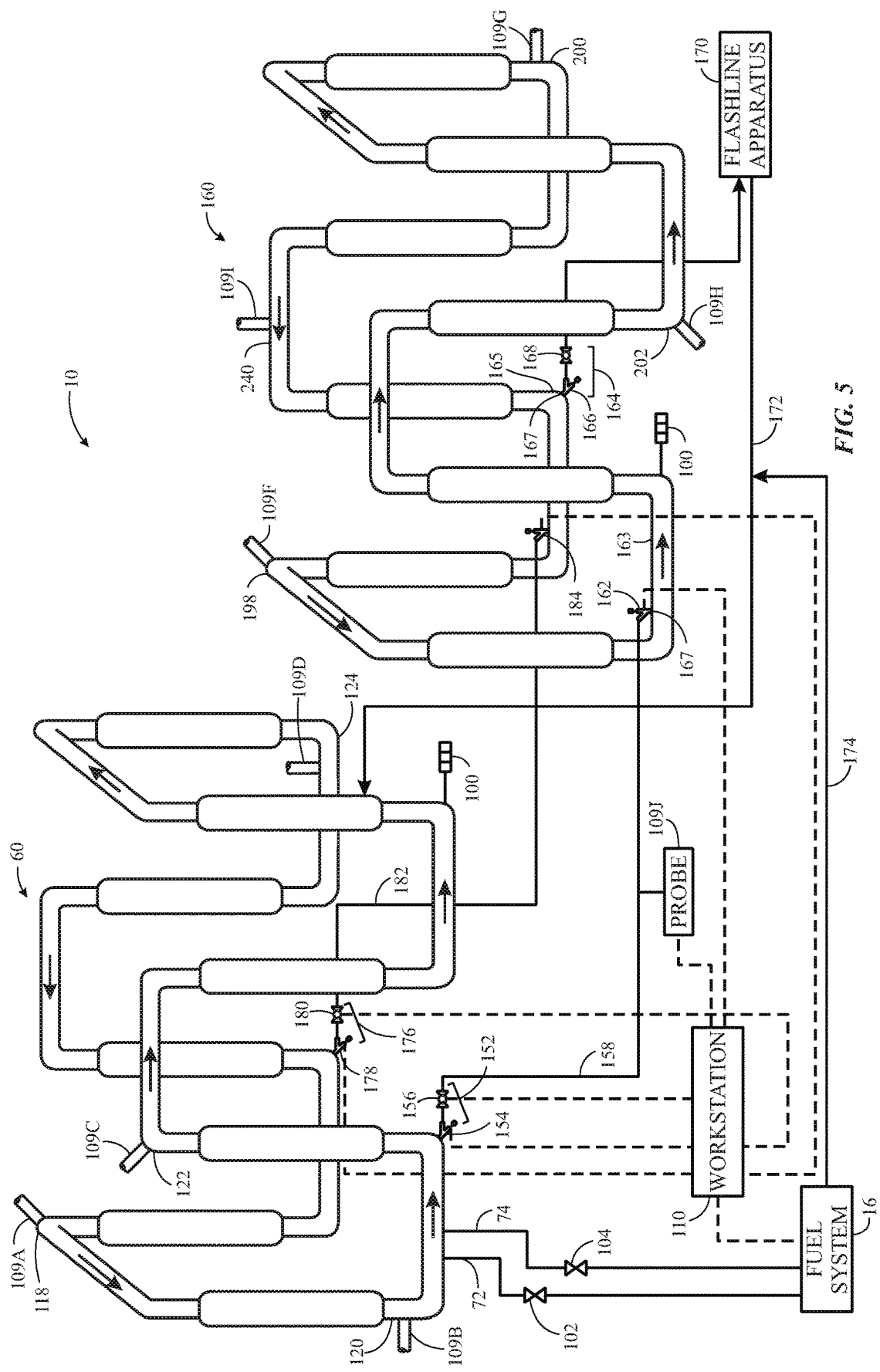
FIG. 5 illustrates a schematic overview of a polymerization system with two loop reactors in series with features for controlling polymerization components and the prevention of reactor fouls, in accordance with an embodiment of the present disclosure.

As shown in the polymerization system 10 of FIG. 5, the reactor 60 (e.g., a first polymerization reactor) produces a slurry that may be continuously withdrawn through a continuous take-off ("CTO") device 152. In some embodiments, the CTO device 152 may contain a number of valves (e.g., 2) that are configured to modulate the removal and flow of slurry from the reactor 60 in a continuous manner. The valves may be, as shown in the illustrated embodiment, a "ram"-type valve 154 and a v-ball valve 156. The CTO device 152 may direct, using the ram valve 154, a portion of the slurry to exit the reactor 60 as a transfer slurry. The CTO device 152 may then control, using the v-ball valve 156, the flow of the transfer slurry through a conduit (e.g., a transfer line) 158 fluidly coupling the reactor 60 with a second reactor 160. One end of the transfer line 158 may couple to the second reactor 160 via, for example, a ram valve 162 to enable the slurry to enter the second reactor 160. In certain embodiments, the ram valve 162 (or entry point) into the second reactor 160 is on the top side of the loop reactor section 163 or on the inside portion of an elbow 165 of the second reactor 160 such that solids in the area of the inlet 167 to the second reactor 160 is minimized. However, it should be understood that the ram valve 162 may be placed anywhere along the second reactor 160. In operation, introduction of the transfer slurry from the reactor 60 into the second reactor 160 facilitates production of a second slurry within the second reactor 160, which may be continuously withdrawn via a CTO device 164 (in certain embodiments containing a ram valve 166 and a v-ball valve 168) leading to a flashline apparatus 170, or other downstream equipment.

During operation, the flashline apparatus 170 may separate a liquid medium of the second slurry from a polymer product of the second slurry. The liquid medium may then be recycled and directed back, via recycle line 172, to the reactor 60 or, in some embodiments, to the second reactor 160 for use in the continuous polymerization process. Additionally, monomer/comonomer, diluent, and catalyst feed lines 174 may feed into the recycle line 172 leading from the flashline apparatus 170 to the reactor 60. The flashline apparatus 170 is discussed in more detail with reference to FIG. 6.

In certain embodiments, the polymerization system 10 has more than one transfer line (e.g., between 2 and 5 transfer lines, inclusive) disposed on each reactor. Such features may include an additional CTO device 176 including a ram valve 178 and a v-ball valve 180 configured to withdraw slurry from the reactor 60 and transfer the slurry, via an additional transfer line 182, to the second reactor 160. As with the primary transfer line 158, the additional transfer line 182 may couple to the second reactor 160 using a ram valve 184. The CTO devices 152 and 176 may be disposed along different take-off positions on the reactor 60 such that certain characteristics of the withdrawn slurry (e.g., slurry velocity, stratified solids content) are substantially the same. Similarly, transfer lines 158 and 182 may be configured to deliver the transfer slurry to the second reactor 160 at about the same position. In other embodiments, transfer lines 158 and 182 may be configured to deliver slurry from the reactor 60 to the second reactor 160 at different positions. Also, transfer lines 158 and 182 may share or have similar valving and control systems such that the workstation 110 may substantially automate the entire process of switching between transfer lines and controlling the flow through each line.

As shown in FIG. 5, the polymerization system 10 includes the analysis systems 109 disposed on a combination of features through which the slurry may pass to enable analysis of the slurry at the various illustrated points. However, in certain other embodiments, the polymerization system 10 may have only one analysis system 109 disposed in the reactor system (e.g., one analysis system 109 even though there are two reactors). Alternatively, the polymerization system 10 may include 2, 3, 4, 5, 6, 7, 8, 9, 10, or more analysis systems 109 disposed in various locations along the reactor 60 and/or the second reactor 160. For example, the reactor 60 may have only one analysis system 109A disposed on an elbow 118 of the reactor 60. Alternatively, or in addition to analysis system 109A disposed on the elbow 118, the analysis system 109B may be disposed along a straight section 120 of the reactor piping. Further, the reactor 60 may have a third analysis system 109C on a second elbow 122 and/or a fourth analysis system 109D on a second straight section 124. It should be understood, that zero, one, or multiple analysis systems 109 may be disposed along the reactor 60.

The second reactor 160 may also include one or more analysis systems 109. For example, the second reactor 160 may have only one analysis system 109F disposed on an elbow 198 of the second reactor 160. Alternatively, or in addition to analysis system 109F disposed on the elbow 198, the analysis system 109G may be disposed along a straight portion 200 of the second reactor 160. Further, the second reactor 160 may have a third analysis system 109H on a second elbow 202 and/or a fourth analysis system 109I on a second straight portion 204. It should be understood, that zero, one, or multiple analysis systems 109 may be disposed along any portion of the second reactor 160.

In certain embodiments, one or more of the analysis systems 109 may be disposed along either, or both, of the transfer lines 158 and 182. As shown in FIG. 5, one analysis system 109J is disposed along the transfer line 158 and is coupled to the workstation 110 to provide feedback related to the particle size of the polymer particulates in the transfer line 158. It may be beneficial to include the analysis systems 109 in the transfer lines 158 and/or 182 because fouling may occur in the transfer lines 158 and/or 182 in addition to within the reactors 60 and 160, themselves.

In addition to detecting and prevent fouling, placing the analysis systems 109 in the reactors 60 and 160 as well as transfer lines 158 and 182 may enable finer control over the polymerization system 10, which may lead to a higher quality product. As discussed previously, simply monitoring operating parameters such as temperature, pressure, density, and the like creates uncertainty about physical characteristics of system contents, thereby resulting in corrective action being taken too early. Early corrective action may lead to a decrease in the quality of the final product by deviating from optimal operating parameter values. Placing the analysis systems 109 at multiple points along the polymerization system 10 may provide more certainty as to the contents at each point along the flow path, thereby enabling finer control over the entire system. For example, one or more of the analysis systems, such as any of the analysis systems 109A through 109J as shown in the Figures, may provide information related to, for example, particle size in each reactor 60 and 160. Therefore, a controller and/or human operator has a better understanding of how any given change in an operating parameter, regardless of how minor, affects the reactor contents at each point along the polymerization system 10. As such, corrective action may not be taken as early, which may generate a higher quality polymer.

Figure 6:
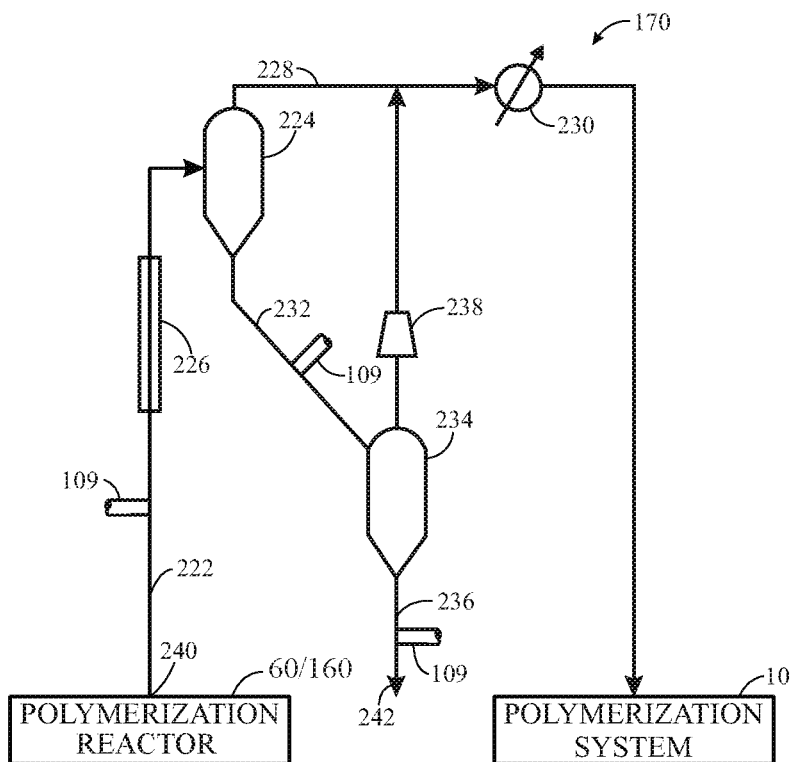
FIG. 6 illustrates a flashline for polyolefin recovery and diluent recycle, in accordance with an embodiment of the present disclosure.

A variety of equipment for further processing of the polymer may be disposed downstream from the reactor system 20. In some instances, it may be beneficial to monitor the particle size of the polymer particulates flowing through such equipment because downstream equipment may also be subject to fouling. FIG. 6 depicts an embodiment of the flashline apparatus 170 disposed downstream from the reactor 60 or 160. The flashline apparatus 170 may include features for isolating the polymer product from the continuously withdrawn product slurry from the second reactor 160 (in the case of series operation), the reactor 60 and the second reactor 160 (in the case of parallel operation), or just the reactor 60 (in the case of a polymerization system 10 with only one reactor). Regardless of the mode of operation, the slurry may pass through conduit 222 into a high pressure flash chamber 224. Conduit 222 includes a surrounding conduit 226, which is provided with a heated fluid to indirectly heat the slurry material in the flash line conduit 222. Vaporized diluent exits the flash chamber 224 via overhead conduit 228 for further processing, which may include condensation by simple heat exchange using recycle condenser 230. The diluent may then return to polymerization system 10. Polymer particles are withdrawn from the high pressure flash chamber 224 via line 232 for further processing. In some aspects, the polymer particles are passed to low pressure flash chamber 234 for further removal of volatiles. Separated diluent, or other volatile materials, passes through compressor 238 to line 228. The recovered polymer particles are conveyed via line 236 to other equipment (e.g., extruder) for further processing, or to a consumer for purchase.

In certain embodiments, the flashline apparatus 170 may include one or more of the analysis systems 109. For example, an analysis system 109 may be disposed at an inlet 240 of the flashline apparatus 170, an outlet 242 of the flashline apparatus 170, along the flash line conduit 222, along line 232, and/or along line 236. Placing the analysis system 109 along one or more of lines 222, 232, and/or 236 may enable monitoring of the particle size of the polymer particulates flowing through the flashline apparatus 170. In certain embodiments, fouling may occur in the flashline apparatus 170 and therefore, monitoring the polymer particulates in the flashline apparatus 170 may be beneficial to prevent fouling in the flashline apparatus 170. Additionally, the particle size of the polymer particulates flowing through lines 222, 232, and/or 236 may be indicative of fouling in other portions of the polymerization system 10. In addition to detecting and prevent fouling, placing the analysis system 109 in the flashline apparatus 170 may enable finer control over the polymerization system 10, which may lead to a higher quality product. The analysis system 109 may provide information related to, for example, particle size in the flashline apparatus 170. Therefore, a controller and/or human operator has a better understanding of how any given change in an operating parameter affects contents in the flashline apparatus 170. Therefore, monitoring characteristics of the polymer particulates in the flashline apparatus 170 may enable the workstation 110 to take preventative measures to prevent fouling in the polymerization system 10 as well as provide finer control over the polymerization system 10, which may lead to a better quality polymer.

Figure 7:
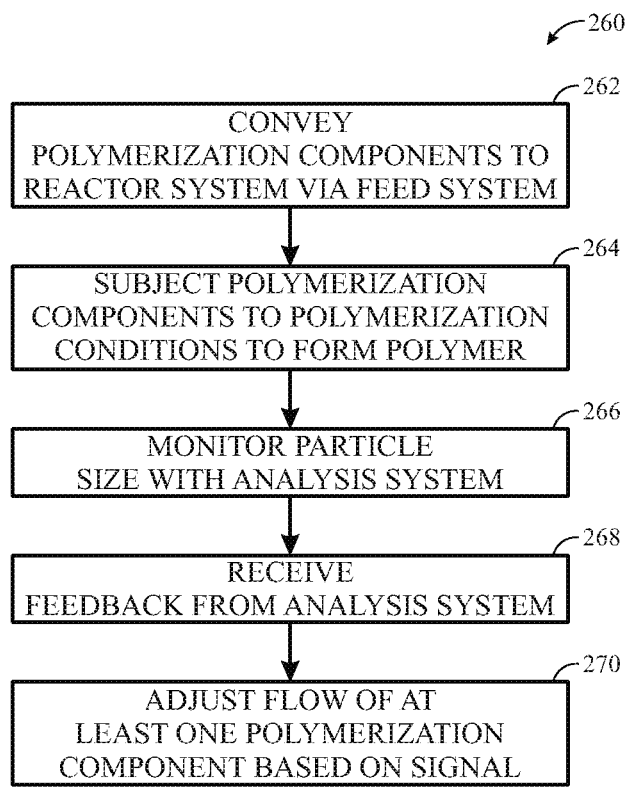
FIG. 7 illustrates a flow chart of a method for monitoring an operating parameter(s) of a polymerization system and making adjustments to a feed system to prevent fouling, in accordance with an embodiment of the present disclosure.

FIG. 7 depicts a flow chart of an embodiment of a method 260 for monitoring an operating parameter(s) of the polymerization system 10 and making adjustments to the feed system 16 to prevent fouling. In certain embodiments, all or some of the operations or steps illustrated in the flow chart 260 may be performed by the workstation 110. At block 262, the control system may command the feed system 16 to convey the polymerization components 14 to the reactor system (e.g., by sending signals to actuators that control valves 102 and/or 104). In certain embodiments, the reactor system 20 may include the loop reactor 60 and/or the second reactor 160. In other embodiments, as noted above, the reactor system 20 may include one or more different types of reactors (e.g., boiling liquid pool, stirred tank, gas phase reactors, and the like) designed to continuously produce a polymer.

At block 264, the polymerization components in the reactor system may be subjected to polymerization conditions to form a polymer. In certain embodiments, the polymerization components include a monomer, a comonomer, a catalyst, a cocatalyst and/or diluent from the feed system 16, and the polymerization conditions may include sufficient mixing of the polymerization components 14, a sufficient pressure to encourage polymerization, and/or a sufficient temperature to encourage polymerization, among others.

At block 266, the workstation 110 may monitor a particle size of the polymer by receiving signals from the analysis system(s) 109 coupled to, or disposed within, the flow path of the reactor system 20. As discussed above, the reactor system 20 may include any number of the analysis systems 109 disposed at a variety of locations along the reactor system flow path. In certain embodiments, an analysis system 109 is disposed on an elbow of the flow path and includes an FBRM probe configured to measure a particle size of the polymer particulates. The analysis system 109 may send feedback (e.g., a signal) corresponding to a particle size of the polymer particulates in the reactor 60 to the workstation 110. In other embodiments, the analysis systems 109 may send raw or lightly processed data to the workstation 110, such as where the workstation 110 has appropriately configured processing equipment and/or appropriately configured software stored on a memory thereof.

At block 268, the workstation 110 may receive the feedback (e.g., a signal) from the analysis system 109. In certain embodiments, the feedback corresponds to the particle size of the polymerization components (e.g., average particle size, a range of particle sizes, a PSD). The workstation 110, in some embodiments, may determine, or calculate, a bulk density value from the feedback. As such, the workstation 110 may receive a second signal from a second analysis system 109 that corresponds to a slurry density (e.g., the density of the liquid fraction of the polymerization components 14). The control system may use the particle size feedback as well as the slurry density feedback to compute a bulk density (e.g., an overall density of the liquid and solid fractions of polymerization components 14). The workstation 110 may perform certain control actions, or cause them to be performed, in response to the feedback. For example, control actions initiated by the workstation 110 may include controlling the flow rate of at least one of the polymerization components 14 via the feed system 16. In certain embodiments, the workstation 110 may be electronically coupled (e.g., via a wire connection or wireless connection) to the analysis system(s) 109 and the feed system 16.

As one example of a control action, at block 270, the workstation 110 may send a signal to an actuator(s) to adjust the valves 102 and/or 104 to control the feed of at least one of the polymerization components (e.g., monomer, comonomer, catalyst, cocatalyst, and diluents) to the reactor system. The signal sent by the workstation 110 may be a pre-programmed response to the feedback from the analysis system(s) 109. As discussed previously, if a value contained in the signal from the analysis system 109 exceeds a threshold level, the workstation 110 may be programmed to increase the rate of diluent 84 feed; reduce the addition of monomer 80, comonomer 82, or catalyst 86; or increase the influx of additives, such as anti-static agents. In certain embodiments, the signal from the workstation 110 is predetermined to prevent fouling and/or to take action when the signal from the analysis system(s) 109 indicates that fouling is, or may, occur. By taking such preventative measures, the polymerization system 10 may operate more efficiently.

ADDITIONAL DESCRIPTION

Systems and methods for monitoring and controlling a polymerization system have been described. The following clauses are offered as further description of the disclosure.

Embodiment 1

A polymerization system, comprising: a reactor system comprising a polymerization reactor and a feed system fluidly coupled to a feed inlet of the reactor, wherein the feed system is configured to supply polymerization components to the reactor via the feed inlet, and the polymerization reactor comprises a flow path configured to continuously convey the polymerization components through an interior of the polymerization reactor and subject the polymerization components to polymerization conditions to produce a polymer slurry comprising a polymer; an analysis system coupled to the polymerization reactor along the flow path, wherein the analysis system is configured to monitor a particle size of the polymer; and a control system coupled to the analysis system and the feed system, wherein the control system is configured to receive a signal from the analysis system indicative of the monitored particle size of the polymer, and is configured to adjust an operating parameter of the feed system to control a flow rate of at least one of the polymerization components to the polymerization reactor based at least on the signal.

Embodiment 2

The polymerization system of embodiment 1, wherein the analysis system comprises a probe tapped into a wall of the polymerization reactor at a position along the flow path.

Embodiment 3

The polymerization system defined in any preceding embodiment, wherein the probe is operable to perform online monitoring of the particle size via light backscattering or video microscopy.

Embodiment 4

The polymerization system defined in any preceding embodiment, wherein the probe is operable to perform online monitoring of the particle size via focused beam reflectance measurement (FBRM) technology.

Embodiment 5

The polymerization system defined in any preceding embodiment, wherein the probe is configured to measure a chord length distribution of the polymer located within a cross-section of the flow path corresponding to a window of the probe.

Embodiment 6

The polymerization system defined in any preceding embodiment, wherein the signal is the chord length distribution and the control system is configured to determine a particle size distribution of the polymer based on the chord length distribution.

Embodiment 7

The polymerization system defined in any preceding embodiment, wherein the probe comprises a laser configured to emit a beam of light into the flow path, and a window configured to receive the beam of light when the beam back scatters off the polymer, and wherein the window of the probe is substantially flush with an inner surface of the wall of the polymerization reactor to prevent the probe from disrupting a flow of the polymer slurry.

Embodiment 8

The polymerization system defined in any preceding embodiment, wherein the probe is operable to perform online monitoring of the particle size via particle vision and measurement (PVM) technology.

Embodiment 9

The polymerization system defined in any preceding embodiment, wherein the polymerization reactor is a loop slurry reactor, and the probe is tapped into an elbow of the loop slurry reactor to enable the probe to monitor a region of flow within the flow path.

Embodiment 10

The polymerization system defined in any preceding embodiment, wherein the signal corresponds to a particle size distribution of the polymer and the control system is configured to determine a bulk density value of the polymer slurry from the signal and to control the flow rate of the at least one polymerization component based on the bulk density value.

Embodiment 11

The polymerization system defined in any preceding embodiment, wherein the control system is configured to determine the bulk density value using the particle size of the polymer and a slurry density value.

Embodiment 12

The polymerization system defined in any preceding embodiment, wherein the feed system is configured to supply a monomer, a comonomer, a catalyst, and a diluent to the polymerization reactor as the polymerization components, and the control system is configured to adjust a respective flow rate of the monomer, the comonomer, the catalyst, the diluent, or any combination thereof, in response to the signal.

Embodiment 13

The polymerization system defined in any preceding embodiment, wherein the control system is configured to adjust the respective flow rate of the monomer to the polymerization reactor in response to the signal when the control system determines that the signal is indicative of a bulk density of the polymer slurry, a particle size distribution of the polymer, an average particle size of the polymer, a particle size range of the polymer, or any combination thereof, outside of a predetermined range.

Embodiment 14

The polymerization system defined in any preceding embodiment, wherein the control system is configured to adjust the respective flow rate of the comonomer to the polymerization reactor in response to the signal when the control system determines that the signal is indicative of a copolymer foul or an incipient copolymer foul.

Embodiment 15

The polymerization system defined in any preceding embodiment, wherein the control system is configured to cause the feed system to adjust the respective flow rate of the catalyst to the polymerization to adjust a bulk density of the polymer slurry when the control system determines that the signal is indicative of a bulk density of the polymer slurry, a particle size distribution of the polymer, an average particle size of the polymer, a particle size range of the polymer, or any combination thereof, outside of a predetermined range.

Embodiment 16

The polymerization system defined in any preceding embodiment, wherein the control system is configured to cause the feed system to adjust the respective flow rate of the diluent to the polymerization to adjust a residence time of the polymer slurry within the polymerization reactor when the control system determines that the signal is indicative of a bulk density of the polymer slurry, a particle size distribution of the polymer, an average particle size of the polymer, a particle size range of the polymer, or any combination thereof, outside of a predetermined range.

Embodiment 17

The polymerization system defined in any preceding embodiment, wherein the reactor system comprises a first loop slurry reactor and a second loop slurry reactor in series, the first loop slurry being upstream of the second loop slurry reactor, and the polymerization reactor is the first loop slurry reactor.

Embodiment 18

The polymerization system defined in any preceding embodiment, wherein the reactor system comprises a first loop slurry reactor and a second loop slurry reactor in series, the first loop slurry being upstream of the second loop slurry reactor, and the polymerization reactor is the second loop slurry reactor.

Embodiment 19

A method for operating a continuous polymerization system, comprising: conveying polymerization components to a reactor system using a feed system, wherein the feed system comprises a flow control device and the reactor system comprises a reactor disposed along a flow path; subjecting the polymerization components to polymerization conditions in the reactor to form a polymer as the polymerization components flow from a reactor inlet to a reactor outlet; monitoring a particle size of the polymer with an analysis system coupled to the flow path; receiving a signal indicative of the particle size from the analysis system with a control system coupled to the feed system and the analysis system; and adjusting the flow control device to adjust a flow rate of at least one of the polymerization components to the reactor system using the control system based on the signal.

Embodiment 20

The method or polymerization system defined in any preceding embodiment, wherein the particle size of the polymer is monitored online via light backscattering, video microscopy, or both.

Embodiment 21

The method or polymerization system defined in any preceding embodiment, wherein the signal corresponds to the particle size of the polymerization components and the control system determines a bulk density value from the signal and controls the flow rate of the at least one polymerization component based on the bulk density value.

Embodiment 22

The method or polymerization system defined in any preceding embodiment, wherein the control system determines the bulk density value based on the particle size of the polymerization components and a slurry density value.

Embodiment 23

The method or polymerization system defined in any preceding embodiment, wherein the polymerization compo-nents comprise a monomer, a comonomer, a catalyst, and a diluent, and the control system controls the flow rate of the monomer, the comonomer, the catalyst, the diluent, or any combination thereof, based on the signal.

Embodiment 24

The method or polymerization system defined in any preceding embodiment, wherein the reactor is a loop slurry reactor, and wherein subjecting the polymerization components to polymerization conditions in the reactor to form the polymer comprises producing a polymer slurry comprising the polymer, and the analysis system comprises a probe tapped into an elbow of the loop slurry reactor.

Embodiment 25

A steady-state polymerization system, comprising: a reactor system, comprising: a feed inlet configured to receive polymerization components; a flow path configured to continuously convey the polymerization components; and a reactor disposed along the flow path and configured to subject the polymerization components to polymerization conditions to produce a polymer; a feed system fluidly coupled to the feed inlet of the reactor system and configured to supply the polymerization components to the reactor system via a flow control device; a first analysis system coupled to the flow path at a first location and configured to monitor a first particle size of the polymer at the first location; a second analysis system coupled to the flow path at a second location and configured to monitor a second particle size of the polymer at the second location; and a control system coupled to the first analysis system, the second analysis system, and the feed system, wherein the controller is configured to receive a first signal from the first analysis system and a second signal from the second analysis system, calculate a bulk density value based on at least one of the first signal or the second signal, and adjust the flow control device to control a flow rate of at least one of the polymerization components to the reactor system based at least on the bulk density value.

Embodiment 26

The steady-state polymerization system defined in any preceding embodiment, wherein the first analysis system, the second analysis system, or both, are operable via online light backscattering or video microscopy.

Embodiment 27

The steady-state polymerization system defined in any preceding embodiment, wherein the control system receives a third signal from a third analysis system and the third signal corresponds to a slurry density of the polymerization components.

Embodiment 28

The steady-state polymerization system defined in any preceding embodiment, wherein the control system calculates the bulk density value using the third signal and at least one of the first signal or the second signal.

Embodiment 29

The steady-state polymerization system defined in any preceding embodiment, wherein the reactor is a loop slurry reactor.

Embodiment 30

The steady-state polymerization system defined in any preceding embodiment, comprising a flashline heater disposed downstream of the loop slurry reactor and along the flow path, wherein the flashline heater is configured to receive effluent from the loop slurry reactor and to separate polymer fluff of the effluent from a diluent of the effluent, and the second analysis system is disposed at an inlet of the flashline heater, along the flashline heater, or at an outlet of the flashline heater, and the control system is configured to adjust a flow rate of at least one of the polymerization components to the reactor system based at least on the second signal.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A steady-state polymerization system, comprising:
a reactor system, a feed inlet of the reactor system configured to receive polymerization components, a loop slurry reactor of the reactor system comprising segments of reactor piping connected by elbows or bends and configured to subject the polymerization components to polymerization conditions to produce a polymer, and a flow path of the reactor system configured to continuously convey the polymerization components through the segments of reactor piping from the feed inlet of the reactor system through an outlet line fluidly connected with the loop slurry reactor;
a feed system fluidly coupled to the feed inlet of the reactor system and configured to supply the polymerization components to the reactor system via a flow control device;
a first analysis system coupled to the flow path at a first location in the loop slurry reactor and configured to monitor a first particle size of the polymer at the first location;
a second analysis system coupled to the flow path at a second location in the loop slurry reactor or the outlet line and configured to monitor a second particle size of the polymer at the second location; and
a control system coupled to the first analysis system, the second analysis system, and the feed system, wherein the control system is configured to receive a first signal from the first analysis system and a second signal from the second analysis system, calculate a bulk density value based on the first signal and the second signal, and adjust the flow control device to control a flow rate of at least one of the polymerization components to the reactor system based at least on the bulk density value, wherein the first location and the second location are not the same location.

2. The steady-state polymerization system of claim 1, wherein the first analysis system, the second analysis system, or both, are operable via online light backscattering or video microscopy.

3. The steady-state polymerization system of claim 1, wherein the control system receives a third signal from a third analysis system coupled to the flow path at a third location in the loop slurry reactor or the outlet line, and the third signal corresponds to a slurry density of the polymerization components.

4. The steady-state polymerization system of claim 3, wherein the control system calculates the bulk density value additionally using the third signal.

5. The steady-state polymerization system of claim 1, wherein the outlet line fluidly connected with the loop slurry reactor comprises a continuous take-off (CTO).

6. The steady-state polymerization system of claim 5, comprising a flashline heater disposed downstream of the loop slurry reactor and along the flow path and a third analysis system configured to monitor a third particle size of the polymer at a third location, wherein the flashline heater is configured to receive effluent from the loop slurry reactor and to separate polymer fluff of the effluent from a diluent of the effluent, and the third location is at an inlet of the flashline heater, along the flashline heater, or at an outlet of the flashline heater.

7. The steady-state polymerization system of claim 6, wherein the control system is configured to receive a third signal from the third analysis system and to adjust a flow rate of at least one of the polymerization components to the reactor system based on the third signal.

8. The steady-state polymerization system of claim 1, wherein the first analysis system comprises a first probe tabbed into a wall of the loop slurry reactor.

9. The steady-state polymerization system of claim 8, wherein the first probe comprises a first laser configured to emit a first beam of light into the flow path, and a first window configured to receive the first beam of light when the first beam of light back scatters off the polymer.

10. The steady-state polymerization system of claim 8, wherein the first probe is flush with an inner surface of the wall of the loop slurry reactor.

11. The steady-state polymerization system of claim 8, wherein the first probe extends into the flow path.

12. The steady-state polymerization system of claim 8, wherein the first probe is in one of the elbows or bends of the loop slurry reactor.

13. The steady-state polymerization system of claim 8, wherein the second analysis system comprises a second probe tabbed into the wall of the loop slurry reactor or into a wall of the outlet line.

14. The steady-state polymerization system of claim 13, wherein the second probe comprises a second laser configured to emit a second beam of light into the flow path, and a second window configured to receive the second beam of light when the second beam of light back scatters off the polymer.

15. The steady-state polymerization system of claim 13, wherein the second probe is flush with an inner surface of the wall of the loop slurry reactor or with an inner wall of the outlet line.

16. The steady-state polymerization system of claim 13, wherein the second probe extends into the flow path.

17. The steady-state polymerization system of claim 13, wherein the second probe is in another of the elbows or bends of the loop slurry reactor.

18. The steady-state polymerization system of claim 1, wherein the polymerization components comprise a monomer, a comonomer, a catalyst, and a diluent.

19. The steady-state polymerization system of claim 18, wherein the control system is configured to adjust a flow rate of the monomer, the comonomer, the catalyst, the diluent, or any combination thereof.

20. The steady-state polymerization system of claim 1, wherein the reactor system comprises a second polymerization reactor connected in series with the loop slurry reactor.

* * * * *